United States Patent
Lou

(10) Patent No.: US 7,526,315 B2
(45) Date of Patent: Apr. 28, 2009

(54) COMMAND INPUT DEVICE COMBINABLE WITH PORTABLE COMMUNICATION APPARATUS

(76) Inventor: Chin-Kuan Lou, 7Fl.-6, No. 165, Shingyun St., Neihu Chiu, Taipei (TW) 114

( * ) Notice: Subject to any disclaimer, the term of this patent is extended or adjusted under 35 U.S.C. 154(b) by 648 days.

(21) Appl. No.: 10/697,730

(22) Filed: Oct. 30, 2003

(65) Prior Publication Data

US 2004/0180693 A1    Sep. 16, 2004

(30) Foreign Application Priority Data

Mar. 12, 2003   (TW) .............. 92105386 A

(51) Int. Cl.
*H04M 1/00* (2006.01)
*H04B 1/38* (2006.01)

(52) U.S. Cl. .............. 455/556.2; 455/557; 455/90.3

(58) Field of Classification Search ............ 455/556.1, 455/556.2, 550.1, 557, 566, 90.3; 463/36, 463/37, 39
See application file for complete search history.

(56) References Cited

U.S. PATENT DOCUMENTS

| | | | |
|---|---|---|---|
| 5,890,016 A * | 3/1999 | Tso ............ | 710/64 |
| 6,434,403 B1 * | 8/2002 | Ausems et al. ........ | 455/556.2 |
| 6,530,838 B2 * | 3/2003 | Ha et al. .............. | 463/36 |
| 6,718,182 B1 * | 4/2004 | Kung ............... | 455/556.1 |
| 6,774,888 B1 * | 8/2004 | Genduso ............ | 345/168 |
| 6,781,819 B2 * | 8/2004 | Yang et al. ........... | 361/680 |
| 6,892,077 B2 * | 5/2005 | Lin .................. | 455/556.1 |
| 6,900,980 B2 * | 5/2005 | Christopher ........ | 361/683 |
| 7,043,281 B2 * | 5/2006 | Huang et al. ........ | 455/575.1 |
| 2002/0119800 A1 * | 8/2002 | Jaggers et al. ....... | 455/550 |
| 2002/0142799 A1 * | 10/2002 | Chu-Chia et al. ..... | 455/556 |
| 2002/0186206 A1 * | 12/2002 | Lee et al. ............. | 345/168 |
| 2003/0032395 A1 * | 2/2003 | Huang et al. ......... | 455/90 |
| 2003/0036428 A1 * | 2/2003 | Aasland .............. | 463/29 |
| 2003/0054856 A1 * | 3/2003 | Glover ............... | 455/556 |
| 2003/0186746 A1 * | 10/2003 | Chuang .............. | 463/42 |
| 2003/0201322 A1 * | 10/2003 | Wu .................. | 235/441 |
| 2004/0198429 A1 * | 10/2004 | Yen et al. ........... | 455/556.1 |
| 2005/0043057 A1 * | 2/2005 | Lo ................... | 455/556.1 |

FOREIGN PATENT DOCUMENTS

| | | |
|---|---|---|
| CN | 1272741 | 11/2000 |
| CN | 1313552 | 9/2001 |

* cited by examiner

*Primary Examiner*—Sonny Trinh
(74) *Attorney, Agent, or Firm*—Workman Nydegger

(57) ABSTRACT

A command input device for use with a digital data processing system and a portable communication apparatus includes a signal connector and a command generator. The signal connector is detachably plugged to a socket of the portable communication apparatus. The command generator is electrically connected to the signal connector and asserts a command signal to the digital data processing system via local wireless transmission modules of the portable communication apparatus and the digital data processing system.

8 Claims, 3 Drawing Sheets

COMMAND INPUT DEVICE COMBINABLE WITH PORTABLE COMMUNICATION APPARATUS

FIELD OF THE INVENTION

The present invention relates to a command input device, and more particularly to a command input device combinable with a portable communication apparatus.

BACKGROUND OF THE INVENTION

With increasing development of a personal computer, more peripheral devices are prerequisites for enhancing functions of the personal computer. In order to expand flexibility of using such peripheral devices and avoid inconvenience and troublesome of wire linkage, various wireless transmission technologies were used to transmit data between the computer and its peripheral devices. For example, a bluetooth network is a new trend to provide localized sensitive information between a personal computer and the peripheral devices thereof. The bluetooth technology is a well known technique, which is generally used in portable communication such as cell phones or personal digital assistants (PDAs), and will not be described in detail herein.

FIG. 1 is a functional block diagram illustrating a conventional wireless transmission system by means of a bluetooth technology. The wireless transmission system comprises a computer 11, a universal serial bus (USB) 12, a receiver 13 and a peripheral device 14. The computer 11 is electrically connected to the receiver 13 via the USB 12. The peripheral device 14, e.g. a mouse, a keyboard, a scanner or a printer, has therein a transmitter 140. The transmitter 140 and the receiver 13 perform the cordless exchange of data with each other by means of a bluetooth standard. Since the peripheral devices having bluetooth modules are costly, it is not popular for common users. In addition to the bluetooth module, the cost of other wireless transmission modules, so far, are also unacceptable by most people.

SUMMARY OF THE INVENTION

It is an object of the present invention to provide a command input device capable of providing wireless transmission with reduced cost.

In accordance with a first aspect of the present invention, there is provided a command input device for use with a digital data processing system and a portable communication apparatus. The command input device comprises a signal connector and a command generator. The signal connector is detachably plugged to a socket of the portable communication apparatus. The command generator is electrically connected to the signal connector and asserts a command signal to the digital data processing system via local wireless transmission modules of the portable communication apparatus and the digital data processing system.

In an embodiment, the local wireless transmission modules of the portable communication apparatus and the digital data processing system are bluetooth transmitters, bluetooth receivers or bluetooth transceivers.

In an embodiment, the command generator obtains electrical power from the portable communication apparatus via the signal connector.

In an embodiment, the command generator is selected from a group consisting of a cursor-control module, a game pad module and a keyboard module.

In an embodiment, the signal connector is selected from a group consisting of an RS 232 signal connector, a universal serial bus (USB) connector, and an IE 1394 signal connector.

In an embodiment, the digital data processing system is one of a personal computer and a video game system.

In an embodiment, the portable communication apparatus is one of a cell phone and a personal digital assistant.

In accordance with a second aspect of the present invention, there is provided a communication system. The communication system comprises a portable communication apparatus, a personal computer and a command input device. The portable communication apparatus is used for communicating with a base station, and has a first local wireless transmission module. The personal computer has a second local wireless transmission module. The command input device is combinable with the portable communication apparatus, and asserts a command signal to the second local wireless transmission module of the personal computer via the first local wireless transmission module of the portable communication apparatus.

In an embodiment, the first and the second local wireless transmission modules are bluetooth transmitters, bluetooth receivers, or bluetooth transceivers.

In an embodiment, the command input device is combined with the portable communication apparatus via a signal connector.

In an embodiment, the portable communication apparatus supplies electrical power to the command input device via the signal connector.

In an embodiment, the command input device is integrated into the portable communication apparatus and disposed on the housing with the portable communication apparatus.

In accordance with a third aspect of the present invention, there is provided a portable communication apparatus for use with a base station and a digital data processing system. The portable communication apparatus comprises a first local wireless transmission module and a command generator. The command generator is electrically connected to the first wireless transmission module and asserts a command signal to the digital data processing system via the first local wireless transmission module, wherein the command signal is selected from a group consisting of a cursor control signal, a display control signal and a data input signal.

In an embodiment, the command signal transmitted from the first local wireless transmission module is received by a second local wireless transmission module of the digital data processing system.

In an embodiment, the first local wireless transmission module and the command generator are disposed on the same housing.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
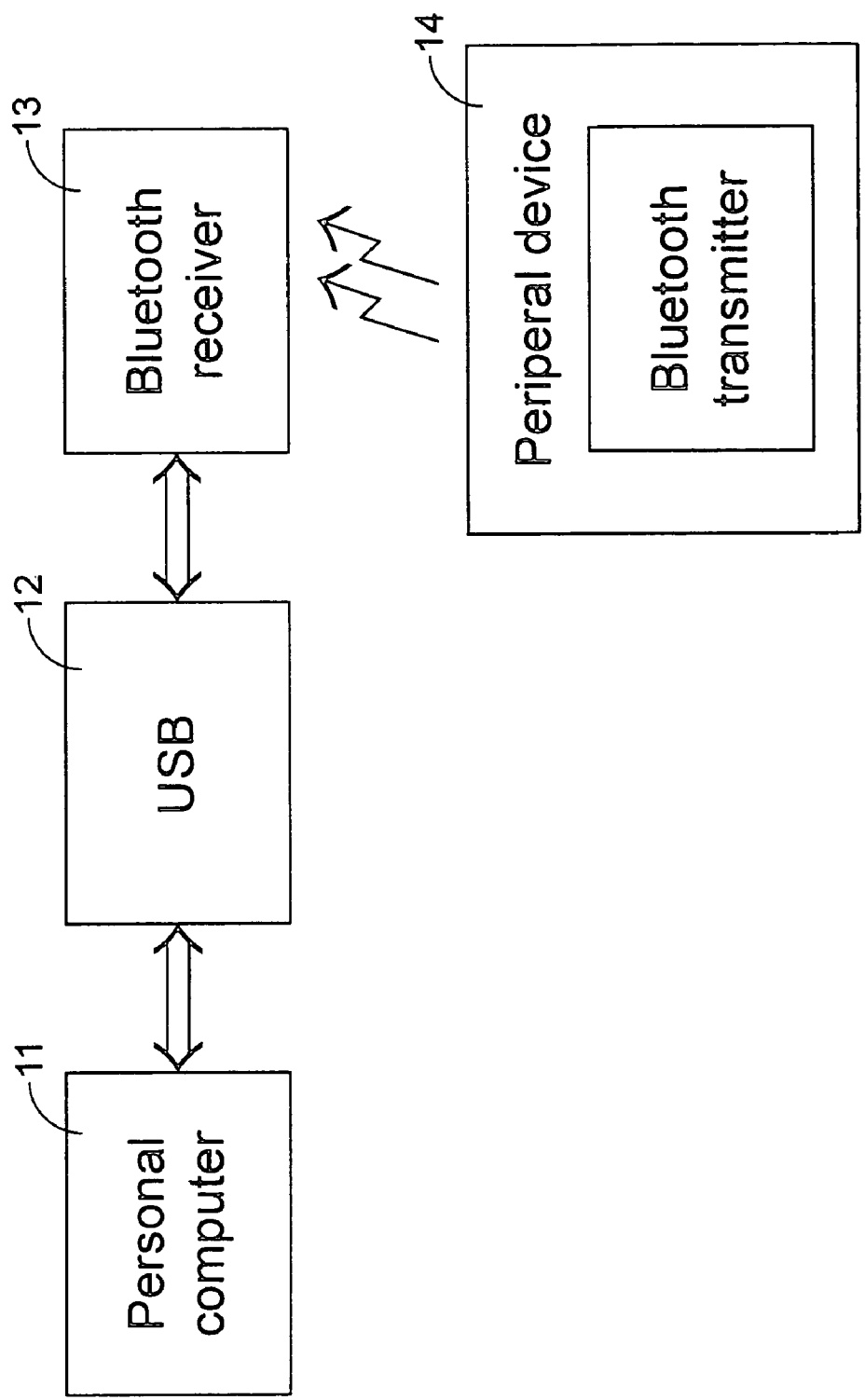
FIG. 1 is a functional block diagram illustrating the communication of a conventional peripheral device with a personal computer by means of a bluetooth technology.
Figure 2:
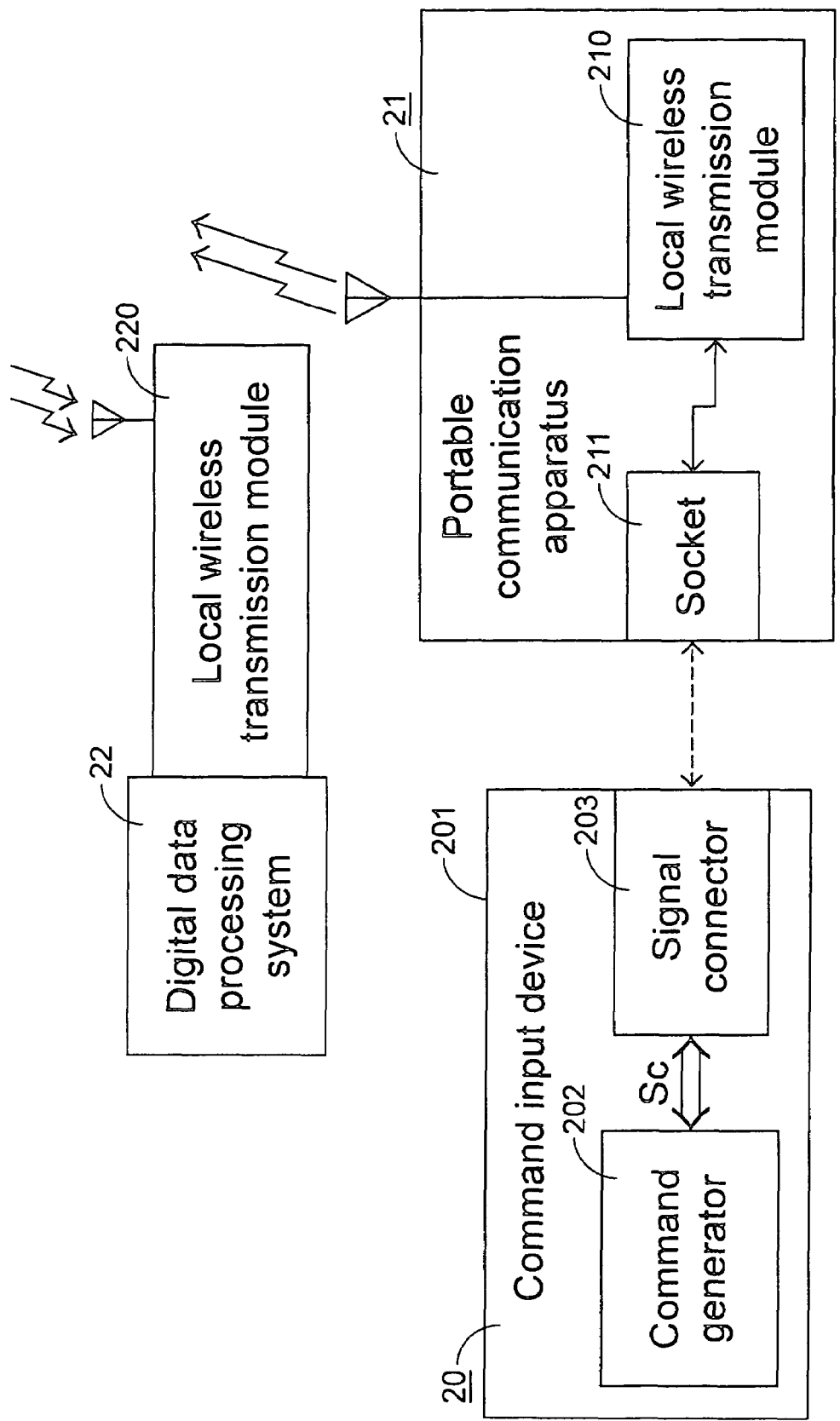
FIG. 2 is a functional block diagram illustrating the communication of a peripheral device with a personal computer via a portable communication apparatus according a preferred embodiment of the present invention.

Referring to FIG. 2, a wireless transmission system according to a preferred embodiment of the present invention is shown. The system comprises a command input device 20, a portable communication apparatus 21 and a digital data processing system 22. In this system, the communication of the command input device with the digital data processing system is conducted via the portable communication apparatus. The command input device 20 comprises a command generator 202 and a signal connector 203, which are disposed on the same housing 201. For example, the command generator 202 can be a cursor control module of, for example, a mouse or a trackball device. In response to the user's control, a cursor control signal Sc indicating changes of the X-Y coordinates is generated from the command generator 202.

The portable communication apparatus 21, for example a cell phone or a personal digital assistant in communication with a distant base station (not shown) comprises a local wireless transmission module 210, a socket 211 and a battery (not shown). The signal connector 203 of the command input device 20 is detachably plugged to the socket 211 of the portable communication apparatus 21. For transmitting command from the input command device 20 to the digital data processing system 22, the signal connector 203 is inserted into the socket 211 to electrically connect the command input device 20 and the portable communication apparatus 21. Meanwhile, the battery within the portable communication apparatus 21 provides electrical power to the command input device 20 and the cursor control signal Sc is transmitted from the command input device 20 to the portable communication apparatus 21 via the signal connector 203 and the socket 211. Afterwards, the cursor control signal Sc is transmitted out from the local wireless transmission module 210 to be received by the local wireless transmission module 220 of the digital data processing system 22 which, for example, can be a personal computer system or a video game system. Via wireless transmission, the coordinates information carried by the cursor control signal Sc can be transmitted to the digital data processing system 22 to be processed.

According to the present invention, the wireless command transmission from the command input device 20 to the digital data processing system 22 can be conducted via the local or short-distance transceivers of the portable communication apparatus 21 and the digital data processing system 22. In other words, it is not necessary for the command input device 20 to equip with any wireless transmission module while it is still able to wirelessly transmit data to the digital data processing system 22. Further, the socket 211 of the portable communication apparatus 21 can be the existent power/signal socket. Therefore, the conventional portable communication apparatus with a wireless transceiver can be used with the command input device 20 without special design and modification.

By using the command input device 20 of the present invention, some components required for the conventional command input device, for example a battery and a wireless transmission module, can be omitted. Thus, the command input device of the present invention is cost-effective and environmentally friendly.

Depending on types, costs and applications, the above-mentioned components may be optionally changed. For example, the command generator 202 can also be a game pad module or a keyboard module. The signal connector 203 used in the present invention can be an RS 232 signal connector, a universal serial bus (USB) connector or an IE 1394 signal connector. The local wireless transmission modules 210 and 220 can be bluetooth transmitters, bluetooth receivers, or bluetooth transceivers.

Figure 3:
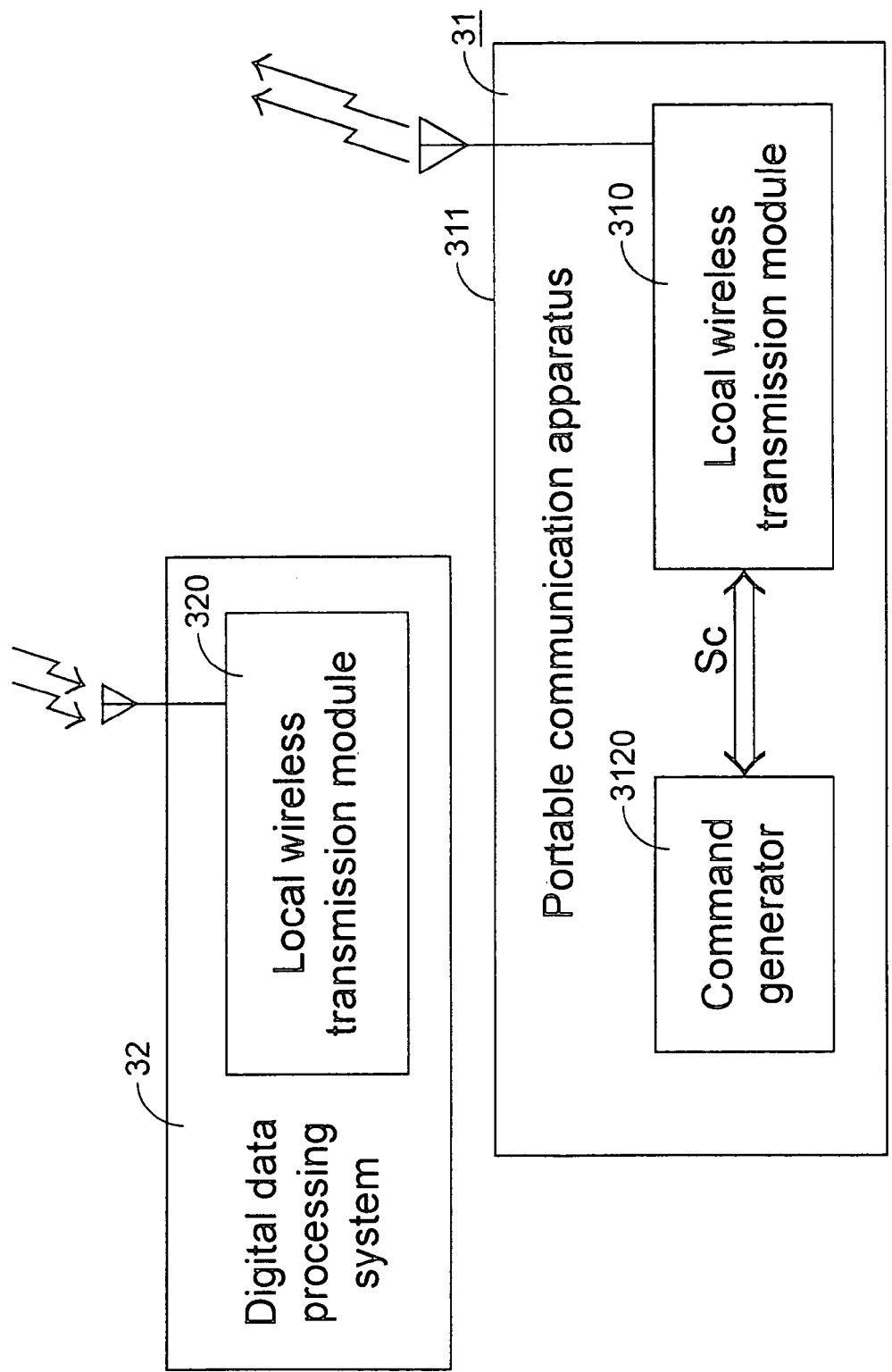
FIG. 3 is a functional block diagram illustrating the communication of a peripheral device integrated with a portable communication apparatus with a personal computer according another preferred embodiment of the present invention.

In a wireless transmission system according to a further embodiment of the present invention as shown in FIG. 3, the command generator is incorporated into the portable communication apparatus. The portable communication apparatus 31, for example a cell phone or a personal digital assistant in communication with a distant base station (not shown) comprises a local wireless transmission module 310. The command generator 3120 is electrically connected to the local wireless transmission module 310 and disposed in the same housing 311 as the local wireless transmission module 310.

The command generator 3120 can be a cursor module, such as a mouse or a trackball. In response to the user's control, a cursor control signal Sc indicating changes of the X-Y coordinates is generated from the command generator 3120. The cursor control signal Sc is then transmitted from the command generator 3120 to the local wireless transmission module 310. Via wireless transmission, the cursor control signal Sc transmitted out from the local wireless transmission module 310 is received by another local wireless transmission module 320 of the digital data processing system 32.

Depending on types, costs and applications, the above-mentioned components may be optionally changed. For example, the command generator 3120 can also be a game pad module or a keyboard module. The digital data processing system 32 can be a personal computer or a video game system. Furthermore, the local wireless transmission modules 310 and 320 can be bluetooth transmitters, bluetooth receivers, or bluetooth transceivers.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A communication system, comprising:
   a portable communication apparatus capable of communicating with a base station, said portable communication apparatus having a first local wireless transmission module; and
   a command input device capable of being combined with said portable communication apparatus, and further capable of asserting a command signal to a second local wireless transmission module of a personal computer via said first local wireless transmission module of said portable communication apparatus, wherein said command input device does not have a wireless transmission module.

2. The communication system according to claim 1 wherein said first and said second local wireless transmission modules comprise one or more devices selected from the group consisting of bluetooth transmitters, bluetooth receivers, and bluetooth transceivers.

3. The communication system according to claim 1 wherein said portable communication apparatus comprises a device selected from the group consisting of a cell phone and a personal digital assistant.

4. The communication system according to claim 1 wherein said command input device is connectable with said portable communication apparatus via a signal connector.

5. The communication system according to claim 4 wherein said portable communication apparatus is adapted to supply electrical power to said command input device via said signal connector.

6. The communication system according to claim 4 wherein said signal connector is selected from the group consisting of an RS 232 signal connector, a universal serial bus (USB) connector and an IL 1394 signal connector.

7. The communication system according to claim 1 wherein said command input device is integrated into said portable communication apparatus.

8. The communication system according to claim 1 wherein said command input device is selected from a group consisting of a cursor control device, a game pad and a keyboard.

* * * * *

UNITED STATES PATENT AND TRADEMARK OFFICE
CERTIFICATE OF CORRECTION

| | | |
|---|---|---|
| PATENT NO. | : 7,526,315 B2 | Page 1 of 1 |
| APPLICATION NO. | : 10/697730 | |
| DATED | : April 28, 2009 | |
| INVENTOR(S) | : Chin-Kuan Lou | |

It is certified that error appears in the above-identified patent and that said Letters Patent is hereby corrected as shown below:

<u>Column 5</u>
Line 8 claim 6, change "IL" to --IE--

Signed and Sealed this

Twenty-first Day of July, 2009

JOHN DOLL
*Acting Director of the United States Patent and Trademark Office*